US007993596B2

(12) United States Patent
Kim et al.

(10) Patent No.: US 7,993,596 B2
(45) Date of Patent: Aug. 9, 2011

(54) DENOX BOILER IN ENGINE COGENERATION PLANT

(75) Inventors: Hyouck-Ju Kim, Daejeon (KR); Hwa-Choon Park, Daejeon (KR); Dae-Hun Chung, Seoul (KR); Jae-Joon Choi, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 283 days.

(21) Appl. No.: 12/235,390

(22) Filed: Sep. 22, 2008

(65) Prior Publication Data

US 2009/0120077 A1    May 14, 2009

(30) Foreign Application Priority Data

Nov. 12, 2007  (KR) .................. 10-2007-0114986

(51) Int. Cl.
*B01D 53/56* (2006.01)
(52) U.S. Cl. .................. 422/173; 422/168; 422/182
(58) Field of Classification Search .............. 422/168, 422/173, 182; 431/115, 116; 122/4 D, 7 R, 122/87, 95.1; 110/345; 60/39.5, 39.52
See application file for complete search history.

(56) References Cited

U.S. PATENT DOCUMENTS

| 4,160,009 | A | * | 7/1979 | Hamabe ................... 422/108 |
| 5,326,536 | A | * | 7/1994 | Carter .................... 422/111 |
| 5,342,592 | A | * | 8/1994 | Peter-Hoblyn et al. ....... 423/235 |
| 7,291,313 | B2 | * | 11/2007 | Wakasa et al. ............. 422/172 |
| 2008/0317652 | A1 | * | 12/2008 | Bono et al. ............... 423/239.1 |

FOREIGN PATENT DOCUMENTS

| KR | 1998-051022 | 9/1998 |
| KR | 100164291 | 9/1998 |

* cited by examiner

*Primary Examiner* — Jill Warden
*Assistant Examiner* — Joye L Woodard
(74) *Attorney, Agent, or Firm* — IPLA P.A.; James E. Bame

(57) ABSTRACT

A gas temperature control apparatus for a DeNOx boiler in an engine cogeneration plant is installed to maintain a reaction temperature of denitrification catalyst used to remove nitrogen oxide generated from an internal combustion engine in the engine cogeneration plant. The apparatus includes a connection passageway between a high-temperature gas part of a combustion tank of the boiler and an intermediate-temperature gas part formed after a first heat exchange, and a flow control valve mounted in the passageway to thereby control a volume of bypass combustion gas. The apparatus can easily raise temperature of combustion gas even though temperature of the inside water of the boiler does not reach a normal operation state since the flow control valve mounted in the connection passageway between the high-temperature gas part and the intermediate-temperature gas part. thereby greatly reducing a time period to reach an activation temperature of the denitrification catalyst.

2 Claims, 2 Drawing Sheets

DENOX BOILER IN ENGINE COGENERATION PLANT

CROSS REFERENCES

Applicant claims foreign priority under Paris Convention and 35 U.S.C. §119 to Korean Patent Application No. 10-2007-0114986, filed Nov. 12, 2007 with the Korean Intellectual Property Office.

BACKGROUND OF THE INVENTION

1. Field of the Invention

The present invention relates to a gas temperature control apparatus for a DeNOx boiler in an engine cogeneration plant, which is installed to maintain a reaction temperature of denitrification catalyst used to remove nitrogen oxide generated from an internal combustion engine in the engine cogeneration plant. More particularly, the present invention relates to a gas temperature control apparatus for a DeNOx boiler in an engine cogeneration plant, which includes a connection passageway between a high-temperature gas part of a combustion tank of the boiler and an intermediate-temperature gas part formed after a first heat exchange, and a flow control valve mounted in the passageway, thereby controlling the volume of bypass combustion gas.

2. Background Art

In general, an internal combustion engine is a motor to move a piston with an expansive force of gas generated by burning and exploding fuel supplied in a cylinder. A boiler is an apparatus for heating water to generate vapor or warm water of high temperature and high pressure, and is mainly used in a heating facility or a bath room, or for driving a turbine, and so on.

As a prior art related with the present invention, U.S. Pat. No. 5,022,226 discloses a 'system for low NO.sub.x cogeneration', which includes an internal combustion engine, an electrical generator, an afterburner, a boiler, a catalyst bed, a fuel economizer, and a chimney.

Furthermore, Korean Patent No. 164,291 discloses a 'burning apparatus for reducing nitrogen oxide (NOx) of a boiler', which can control an air volume supplied from a combustion chamber of the boiler by a damper to thereby controlling generation of NOx, namely, one of harmful gases, generated by combination between nitrogen and oxygen.

Moreover, Korean Patent Laid-open No. 1998-051022 discloses a 'bypass auxiliary catalytic converter'. In Korean Patent Laid-Open Publication No. 1998-051022, an exhaust pipe is connected to an inlet and an outlet of a main catalytic converter to bypass some of the gas discharged from an exhaust manifold.

However, in case of such prior arts have several problems, since it takes about two hours to raise temperature of water to a normal state and combustion gas of a low temperature state is introduced into a denitrification catalyst layer during the above time period, and hence, nitride oxide is not decomposed due to nonactivation of denitrification catalyst. Accordingly, the nitride oxide of high density discharged from the engine is discharged to the outside as it is, and hence, it causes air pollution and error actions of the system.

SUMMARY OF THE INVENTION

Accordingly, the present invention has been made to solve the above-mentioned problems occurring in the prior arts, and it is an object of the present invention to provide a gas temperature control apparatus for a DeNOx boiler in an engine cogeneration plant, which can easily raise temperature of water up to an activation temperature of denitrification catalyst located in an intermediate-temperature gas part, thereby removing nitrogen oxide generated from an internal combustion engine in the engine cogeneration plant.

To accomplish the above object, according to the present invention, there is provided a gas temperature control apparatus for a DeNOx boiler in an engine cogeneration plant, which includes a combustion tank located at a central portion of the inside of a boiler body of the boiler, a first fire tube mounted at a lower part of the boiler body, a second fire tube mounted at an upper part of the boiler body, and a denitrification catalyst layer formed between the first fire tube and the second fire tube to remove nitrogen oxide, comprising: a pair of bypass gas flow channels mounted at lower end portions of both sides of the combustion tank; and bypass flow control valves respectively embedded in bypass passageways of the bypass gas flow channels to control a flow rate of combustion gas, the bypass flow control valves being adapted to open and close the bypass passageways to control the flow rate by changing the degree of opening while moving in a straight line according to a change in flame temperature.

Furthermore, each of the bypass flow control valve includes: a water cooled plug fixed on valve plug support bearings; a valve plug attached at one side end of the water cooled plug to open or close the bypass gas passageway; a cooling water inlet and a cooling water outlet formed at the other side end of the water cooled plug to cool heat of a high-temperature combustion gas; and a control motor lever connected to the water cooled plug by the medium of a hinge lever to promote a reciprocal motion of the water cooled plug.

Moreover, the denitrification catalyst layer is formed between the first fire tube and the second fire tube inside the boiler body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

Figure 1:
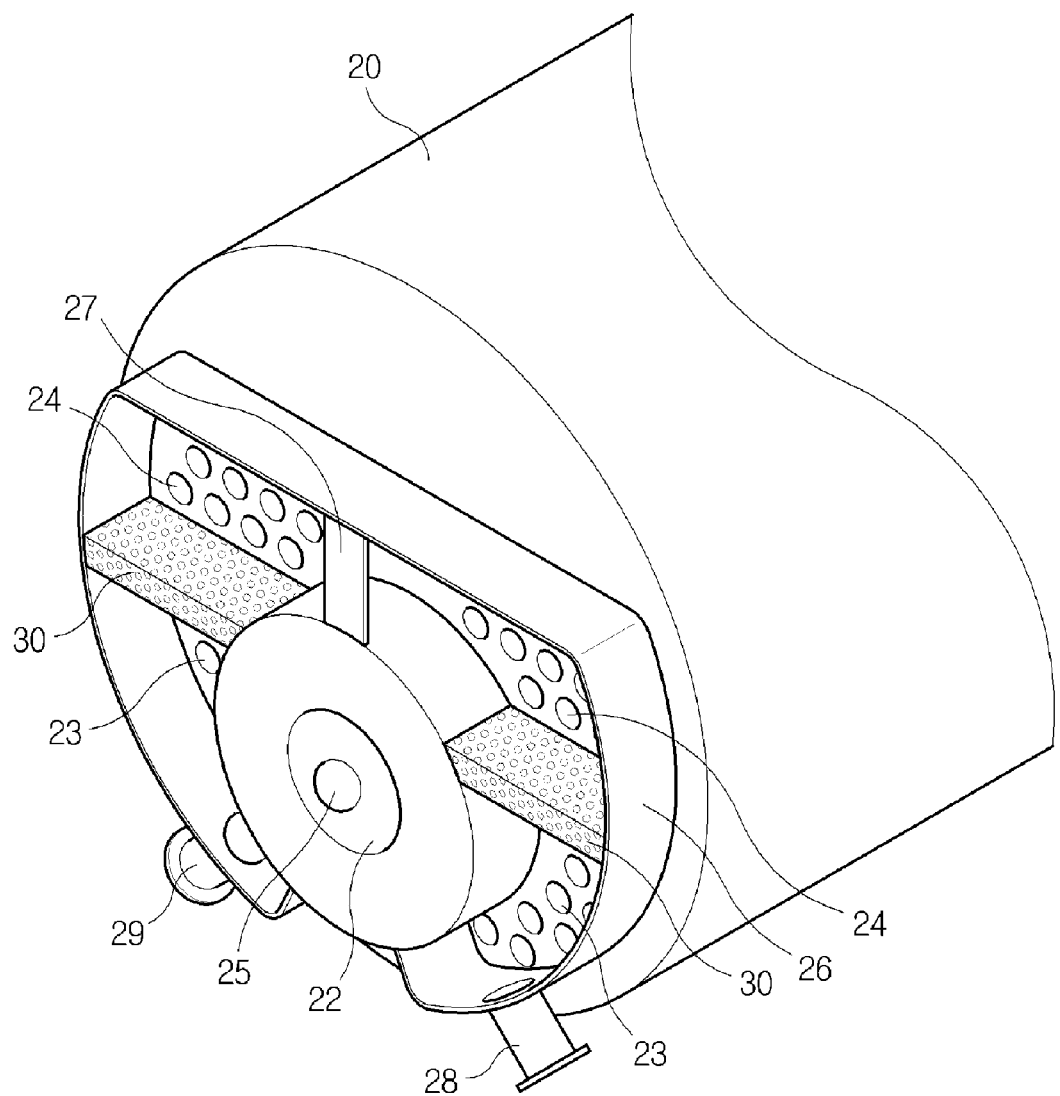
FIG. 1 is a front perspective view of a flue tube boiler according to a preferred embodiment of the present invention.
Figure 2:
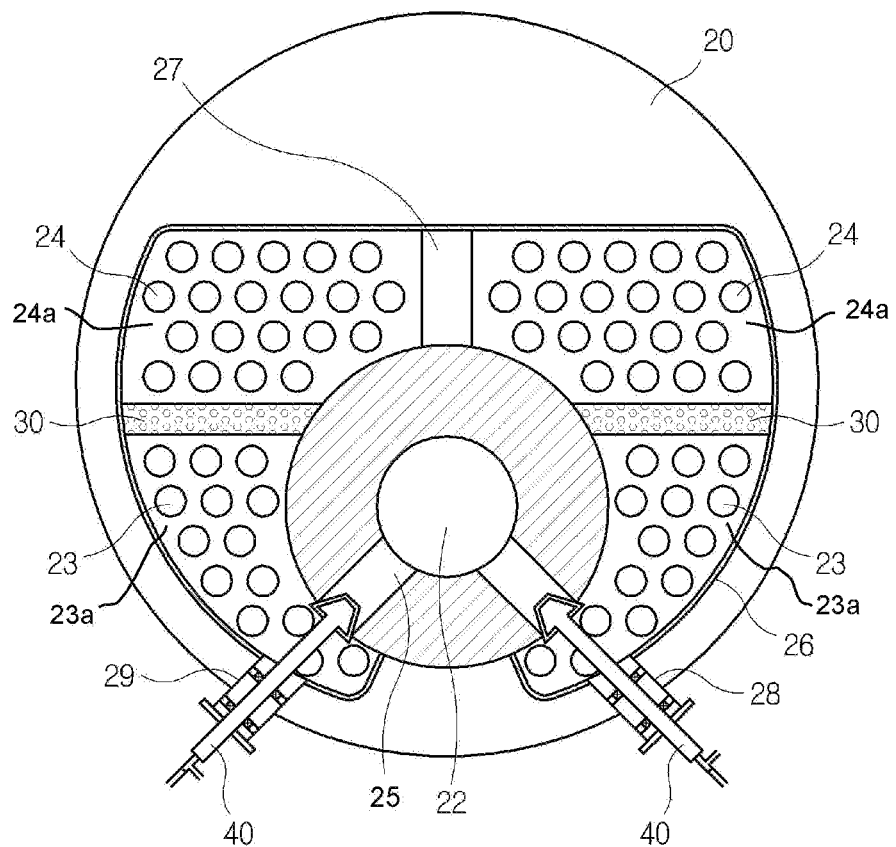
FIG. 2 is a sectional view of FIG. 1.
Figure 3:
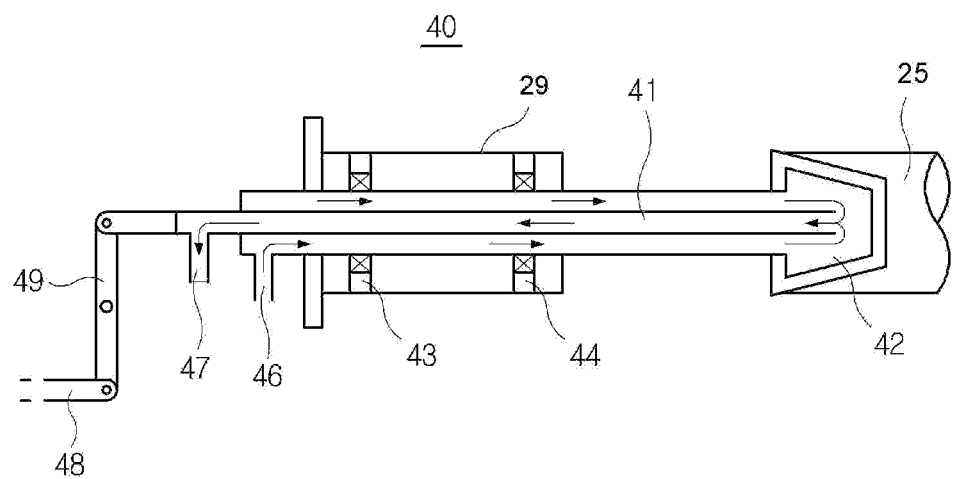
FIG. 3 is a sectional view showing a structure of a bypass flow control valve according to the present invention.

FIG. 1 is a front perspective view of a flue tube boiler according to a preferred embodiment of the present invention, FIG. 2 is a sectional view of FIG. 1, and FIG. 3 is a sectional view showing a structure of a bypass flow control valve according to the present invention.

As shown in FIG. 1, a flue tube boiler according to a preferred embodiment of the present invention, for instance, a gas temperature control apparatus of a DeNOx boiler in an engine cogeneration plant, will be described.

In FIGS. 1 and 2, the flue tube boiler includes a boiler body 20, a combustion tank 22 located at a central portion of the inside of the boiler body 20, a first fire tube 23 mounted in a lower part of the boiler body 20, and a second fire tube 24 mounted in an upper part of the boiler body 20. A denitrification catalyst layer 30 is formed between the first fire tube 23 and the second fire tube 24 defining a lower chamber 23a and an upper chamber 24a.

The flue tube boiler further includes: a front firebox cover 26 mounted in front of the first fire tube 23 and the second fire tube 24; a cover fixing plate 27 joined to the center of an upper end thereof; and a pair of bypass gas flow channels 28 and 29 mounted at lower end portions of both sides of the combustion tank 22. Bypass flow control valves 40 are respectively embedded in bypass passageways 25 of the bypass gas flow channels 28 and 29 to control a flow rate of combustion gas. The bypass flow control valves 40 open and close the bypass passageways 25 to control the flow rate while moving in a straight line according to a change in flame temperature.

Temperature of the combustion gas discharged out after passing through the first fire tube 23 may be lower than temperature required by the denitrification catalyst layer 30 since the combustion gas is deprived of heat by the inside water. Particularly, since a transfer of a great deal of heat occurs when the boiler is first operated, the temperature of the combustion gas is still lower than an activation temperature of the denitrification catalyst of 450.degree. C. to 550.degree. C. Accordingly, in order to maintain the activation temperature of the denitrification catalyst when the boiler is first operated or an engine load is reduced, it is necessary to provide the bypass gas flow channels and means for controlling the bypass flow rate described in the present invention. As described above, when the temperature of the combustion gas does not reach the activation temperature of the denitrification catalyst, since the catalyst does not show its own function, nitrogen oxide contained in engine exhaust gas is not decomposed and a great deal of the non-decomposed nitrogen oxide is discharged out through a chimney as it is, and hence, it causes a serious air pollution.

The combustion gas passes through the combustion chamber of the flue tube boiler and turns back to be discharged through the first fire tube 23. After that, the combustion gas passes through the denitrification catalyst layer 30, transfers its heat to water of the boiler in the second fire tube 24, and then, discharged through the chimney after passing through the next process in a state where its temperature gets lower.

FIG. 3 is a section view showing a structure of the bypass flow control valve 40.

That is, FIG. 3 illustrates the structure of the bypass flow control valve 40 embedded in each of the bypass gas passageways 25 of the bypass gas flow channels 28 and 29 shown in FIG. 2. The bypass flow control valve 40 includes: a water cooled plug or a water cooled valve stem 41 fixed on valve plug support bearings or valve stem support bearings 43 and 44; a valve plug 42 attached at one side end of the water cooled plug 41 to open or close the bypass gas passageway 25; a cooling water inlet 46 and a cooling water outlet 47 formed at the other side end of the water cooled plug 41 for cooling the valve plug to thereby prevent a damage of the valve plug by a high-temperature combustion gas; and a control motor lever 48 connected to the water cooled plug 41 by the medium of a hinge lever 49 to promote a straight movement of the water cooled plug 41. While the control motor lever 48 moves, the water cooled plug 41 can perform a reciprocal motion. A control motor is constructed in such a way as to automatically determine opening and closing and the degree of opening by measuring temperature of the combustion gas introduced into the denitrification catalyst layer. After cooling water is injected into the cooling water inlet 46, the cooling water circulates in a direction of an arrow indicated in FIG. 3, and then, flows out through the cooling water outlet 47, so that heat of the high-temperature combustion gas is cooled.

As described above, the gas temperature control apparatus for the DeNOx boiler in the engine cogeneration plant according to the present invention sends the high-temperature combustion gas to the denitrification catalyst layer of an intermediate temperature part through the bypass flow channels to thereby minimize that nitrogen oxide contained in the engine exhaust gas is discharged out as it is since temperature of the inside water does not reach a normal state when the boiler starts to operate or does not reach the activation temperature of the denitrification catalyst due to the reduced engine load.

Accordingly, the present invention can greatly reduce a time period required to operate the boiler and extend a lifespan of the expensive denitrification catalyst by maintaining temperature of the combustion gas uniformly.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A DeNOx boiler in an engine cogeneration plant, comprising:
    a boiler body including a combustion tank located in a central portion of the boiler body;
    a plurality of first fire tubes mounted in a lower part of the boiler body;
    a plurality of second fire tubes mounted in an upper part of the boiler body;
    a denitrification catalyst layer disposed in the boiler body between the upper and lower parts of the boiler body and defining an upper chamber and a lower chamber in open communication with the second and first fire tubes, respectively;
    a pair of bypass gas flow channels located in the combustion tank in open communication with the lower chamber;
    bypass flow control valves respectively installed in the bypass gas flow channels for opening and closing the bypass channels to control the flow rate of combustion gases from the lower chamber into the combustion tank by changing the degree of opening while moving in a straight line according to a change in flame temperature so as to maintain a temperature of the denitrification catalyst layer approximately at an activation temperature of the denitrification catalyst;
    wherein combustion gases produced in the centrally located combustion tank pass through the combustion tank and circulate back through the first fire tubes into the lower chamber, through the bypass channels and into the combustion tank until the temperature of the combustion gases in the lower chamber reaches the approximate activation temperature of the denitrification catalyst whereafter the degree of opening of the bypass channels is adjustable for forcing the combustion gases to flow from the lower chamber through the denitrification catalyst into the upper chamber and through the second fire tubes for discharge through a chimney.

2. The boiler according to claim 1, wherein each of the bypass flow control valves comprises:
    a water cooled valve stern mounted on valve stem support bearings;
    a valve plug attached at one side end of the water cooled valve stem to open or close the bypass gas passageway; and
    a control motor lever connected to the water cooled valve stem by the medium of a hinge lever to promote a reciprocal motion of the water cooled valve stem.

* * * * *